United States Patent [19]
Osborn

[11] Patent Number: 6,077,576
[45] Date of Patent: Jun. 20, 2000

[54] VEHICLE FINISHING TRIM

[76] Inventor: Michael J Osborn, 23592 Windsong, #13-C, Aliso Viejo, Calif. 92656

[21] Appl. No.: 08/955,485

[22] Filed: Oct. 22, 1997

[51] Int. Cl.[7] .................................................. B60R 13/04
[52] U.S. Cl. .............................. 428/31; 296/209; 280/770
[58] Field of Search ............................ 296/29, 32, 146.9, 296/187, 199, 209; 280/770; 52/716.5, 716.8, 717.01; 29/402.09, 402.14, 402.15; 428/31, 122

[56] References Cited

U.S. PATENT DOCUMENTS

| | | | |
|---|---|---|---|
| D. 305,323 | 1/1990 | Anderson et al. | D12/203 |
| D. 336,885 | 6/1993 | Hart et al. | D12/203 |
| D. 374,419 | 10/1996 | Thomas, Jr. | D12/203 |
| 1,480,292 | 1/1924 | Neuman . | |
| 1,604,855 | 10/1926 | Skitt . | |
| 2,837,371 | 6/1958 | McKee | 296/44 |
| 3,382,616 | 5/1968 | Adell | 49/462 |
| 3,608,957 | 9/1971 | Maneck | 296/146 |
| 4,555,870 | 12/1985 | McKinnon et al. | 49/462 |
| 4,587,762 | 5/1986 | Adell | 49/462 |
| 4,817,335 | 4/1989 | Adell | 49/462 |
| 5,062,665 | 11/1991 | Schotthoefer | 280/770 |
| 5,139,306 | 8/1992 | Ott et al. | 296/198 |
| 5,286,049 | 2/1994 | Khan | 280/163 |
| 5,304,409 | 4/1994 | Nozaki | 428/122 |
| 5,382,035 | 1/1995 | Waddington et al. | 280/169 |
| 5,466,034 | 11/1995 | Savage | 296/191 |
| 5,501,475 | 3/1996 | Bundy | 280/166 |
| 5,584,150 | 12/1996 | Newman | 52/204.2 |

FOREIGN PATENT DOCUMENTS

| | | | |
|---|---|---|---|
| 240781 | 11/1959 | Australia | 296/183 |

OTHER PUBLICATIONS

Mill Supply, Incorporated Catalog, p. 127, 3241 Superior Avenue, Cleveland Ohio 44114, Feb. 1991.

*Primary Examiner*—B. Dayoan
*Assistant Examiner*—Paul Chenevert
*Attorney, Agent, or Firm*—James G. O'Neill

[57] ABSTRACT

A finishing trim for a rocker panel flange is manufactured from an elongated strip of material having a plurality of openings therein so as to enable it to be secured to the rocker panel flanges of a vehicle to provide both a decorative and protective covering thereto. The finishing trim may also include lights connected thereto, or incorporated therein.

9 Claims, 2 Drawing Sheets

VEHICLE FINISHING TRIM

BACKGROUND OF THE INVENTION

1. Field of the Invention

This invention relates generally to vehicle trim, and more specifically, to a vehicle edge dressing for covering and protecting rocker panel flanges, or the like, on the lower portions of vehicles.

2. Description of Related Art

Most vehicles, when they come from the manufacturer have what is referred to as a rocker panel, underneath the door openings on each side thereof. This rocker panel ends in a flange, which extends well below the body and frame of the vehicle, under the door openings, and behind the rear wheel wells of such vehicles. In many vehicles, such as sports utility, pick up trucks and van-type vehicles, running boards or decorative flare strips, or other fiberglass decorative materials are added to the vehicle for aesthetic purposes, or to enable a person to enter and egress from a heightened vehicle. Examples of such running boards, steps, flare strips, and the like, are shown in Design U.S. Pat. Nos. 305,323, 336,885 and 374,419. Additionally, various types of running boards secured to vehicles are shown in U.S. Pat. Nos. 3,608,957, 5,286,049, 5,382,035, 5,466,034 and 5,501,475. None of these patents, however, show any type of decorative or protective strip that is mounted directly to and covers at least a portion of the rocker panel flange on both sides of a vehicle. Therefore, there exists a need in the art for a decorative and protective rocker panel flange strip.

SUMMARY OF THE INVENTION

It is, therefore, an object of the present invention to provide a new and improved finishing trim for a vehicle. It is a particular object of the present invention to provide an improved finishing trim for a vehicle rocker panel flange. It is a still ore particular object of the present invention to provide an improved finishing trim for a rocker panel flange of a vehicle made from a substantially U-shaped, metallic material, secured to a vehicle rocker panel flange by securing means. And, it is yet a more particular object of the present invention to provide an improved protective strip for a rocker panel flange of a vehicle, which protective strip may be made in any shape, from substantially any material, in any desired color or finish, and which may incorporate lighting means therein.

In accordance with one aspect of the present invention there is provided an elongated strip of metallic material, having a plurality of securing means and which is shaped into an element, and finished for securing to the rocker panel flanges of a vehicle.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 11 is a still further perspective view of a vehicle finishing trim of the present invention, incorporating lighting means therein.

DETAILED DESCRIPTION OF THE PREFERRED EMBODIMENT

The following description is provided to enable any person skilled in the art to make and use the invention, and sets forth the best modes contemplated by the inventor of carrying out his invention. Various modification, however, will remain readily apparent to those skilled in the art, since the generic principles of the present invention have been defined herein, specifically to provide for a vehicle finishing trim for customizing a vehicle to provide a cleaner, more aesthetically pleasing appearance.

Figure 1:
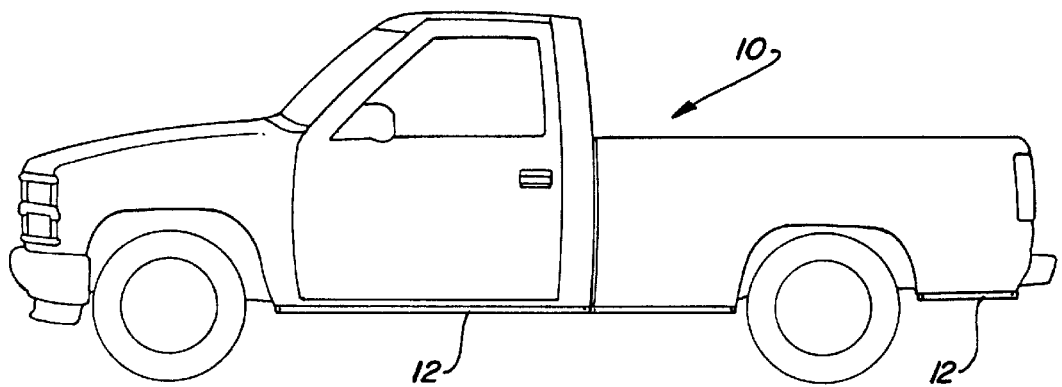
FIG. 1 is a side elevational view of a vehicle showing one side thereof with a finishing trim secured thereto over the rocker panel flange, below the door and rear portions thereof.
Figure 2:
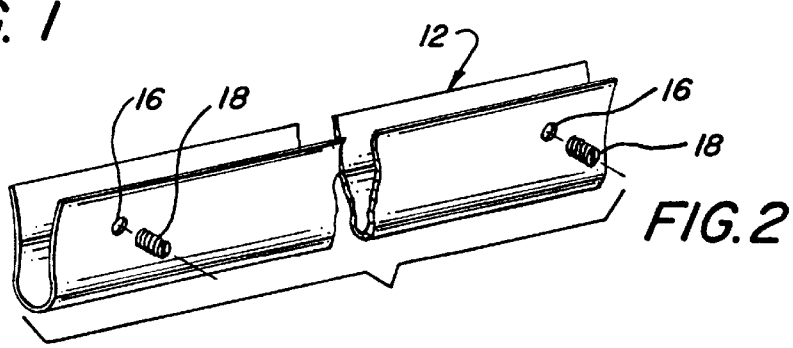
FIGS. 2, 3 and 5 through 9–11 are perspective views of various versions of the preferred embodiments of vehicle finishing trim of the present invention.
Figure 3:
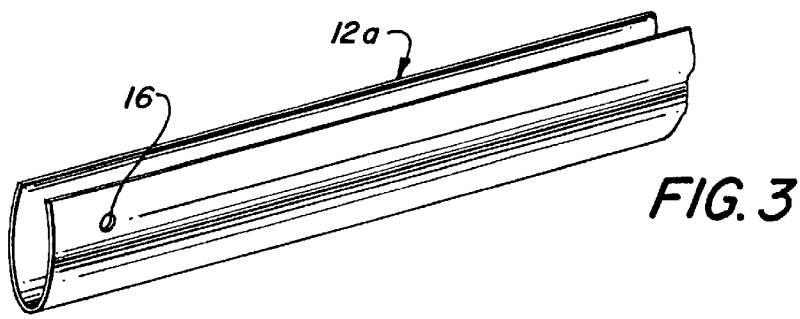
Figure 4:
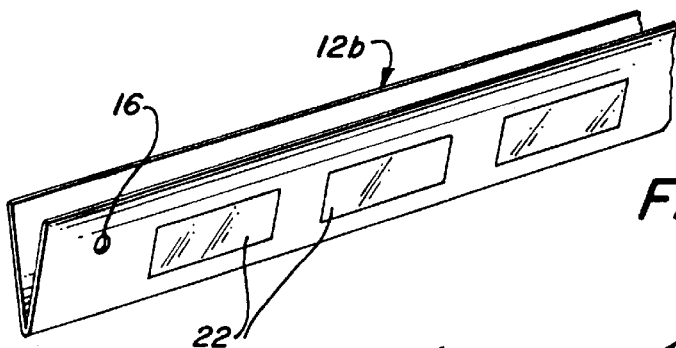
FIG. 4 is a perspective view of a further embodiment of a vehicle finishing trim of the present invention, having strip lighting means therein.
Figure 10:
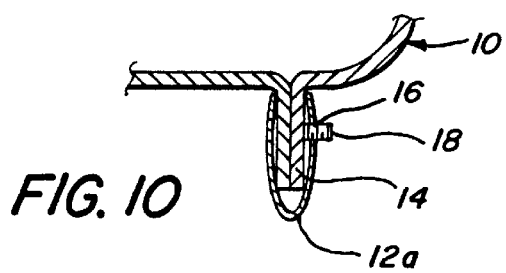
FIG. 10 is an enlarged, partial, cross sectional view showing a vehicle finishing trim of the present invention, mounted on a rocker panel flange of a vehicle, and held in place by securing means.
Figure 5:
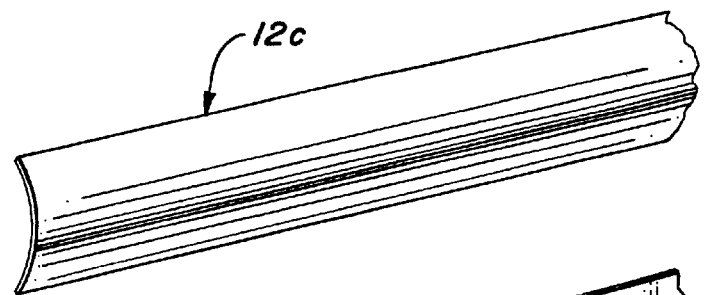
Figure 6:
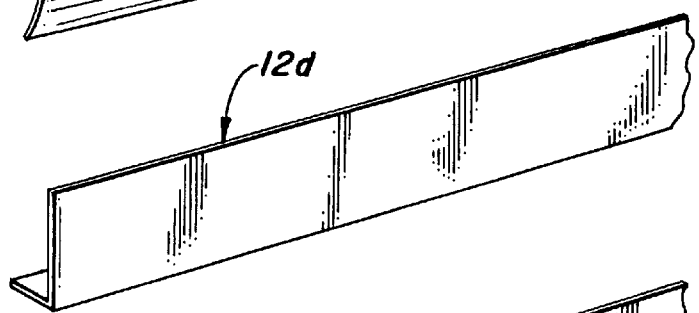
Figure 7:
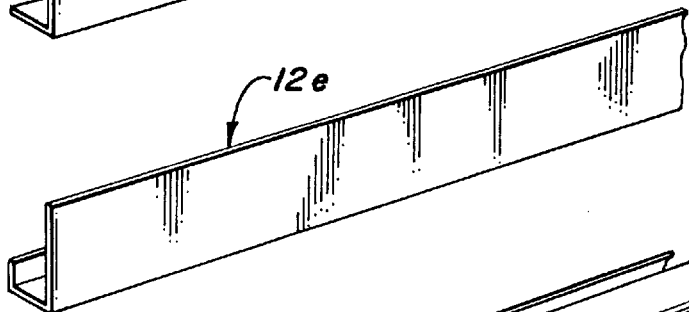
Figure 8:
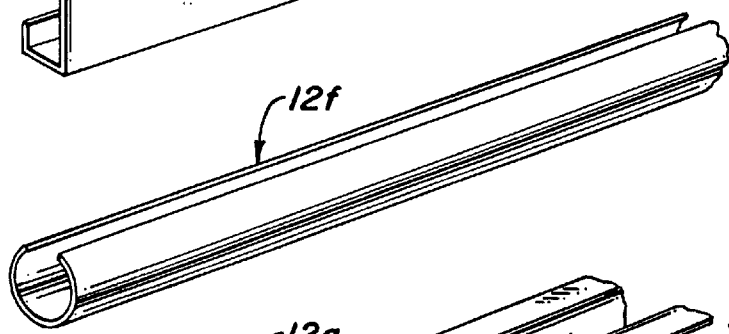
Figure 9:
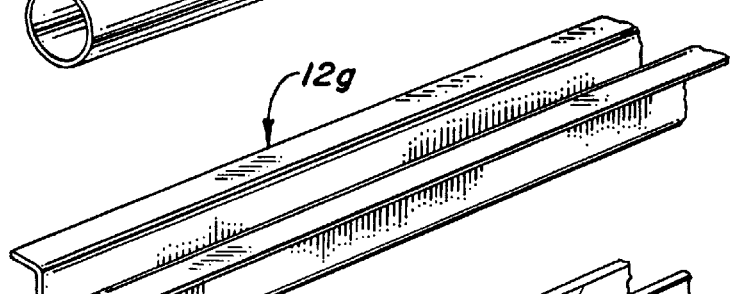
Figure 11:
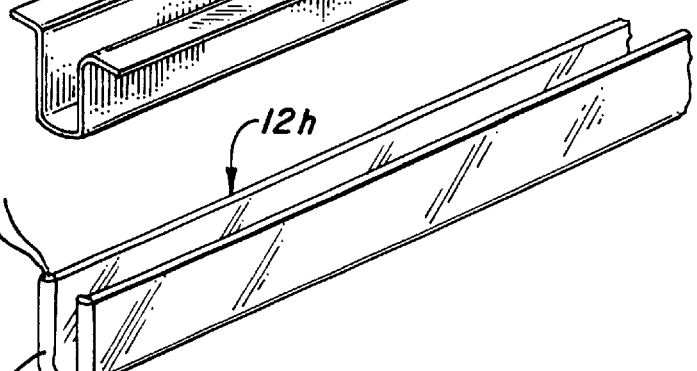

Turning now to the drawings, there shown is a vehicle 10 having a finishing trim or edge strip 12 added thereto on both sides of the vehicle, over a rocker panel flange 14 (See FIG. 10). The edge strip is preferably formed in a universal U-shape, such as shown in FIGS. 2, 3, 9 and 10; or may be formed as a V-shape (FIG. 4); a single curve shape (FIG. 5); an L-shape (FIGS. 6 and 7); or, a partial circle (FIG. 8). The edge strip is preferably formed from an elongated strip of metal or plastic, which may vary in length and width, depending on the vehicle to which it is to be applied. For example, the strips may be from one half to two inches wide, and may be die stamped from a $\frac{1}{64}$" inch gauge steel. The strip may be attached to the vehicle in any desired manner, by, for example, a plurality of holes or openings 16 drilled or punched therein, having set screws, or the like, 18 secured therein. The strip is contoured or formed into the preferred shape for the vehicle to which it is to be applied, and may be finished, as by being dipped into chrome, painted black or any other desired color, provided with a diamond-plate or other decorative exterior, and in some embodiments, may be provided with lights, such as a lighted strip 20, as shown in FIG. 11, or may have strip lights 22 incorporated therein, or added thereto. The lighted strip 20, or strip lights 22, are connected to a power source, in a manner well known to those skilled in the art.

After being formed, the strip is secured to the vehicle, either by set screws 18 alone, or with a silicone sealer, applied between the interior of the edge strip 12, and the rocker panel flange to which it is to be applied. Openings may be formed or drilled into the rocker panel flange, or other suitable fasteners may be screwed through the openings 16, so as to penetrate the drilled openings and secure the finishing trim along and over the rocker panel flanges, beneath the door openings, and behind the wheel wells of a vehicle. If a lighted strip 22 is used, which lighted strip may include a light source at one end and includes a light pipe, fiber optic strip, or other equivalent means to project the light, other types of suitable fasteners should be used.

It is to be understood, that depending on the length, size and shape of the rocker panel flange of the vehicle to be covered, the finishing trim may take various shapes, such as those shown in 12 through 12g, and is specifically sized and dimensioned to cover all of the exterior portions of the rocker panel flanges, if possible, or only the front, and/or lower surface, if the rear portion is to be left open, or is inaccessible.

When fitted to and secured onto the rocker panel flanges of the vehicle, the edge strip 12 of the present invention will be sized, dimensioned and shaped so as to fit snugly and to be held in place on the rocker panel flanges by any desired securing means. Therefore, the edge strip 12 will not only provide a pleasing, more aesthetic appearance to the lower portion of the vehicle, but will protect the vehicle rocker panel flanges against ice, mud, sand, snow, rain water and various road materials, such as tar and the like. Furthermore, because of the finish thereon, the finishing strip trim 12 of the present invention may be easily cleaned by a chrome or other type cleaner, so as to provide the vehicle with a customized, more appealing and cleaner look.

It, therefore, can be seen that the present invention provides a novel and improved means for dressing and protecting the rocker panel flanges on a vehicle to provide the vehicle with a more customized look, and to further protect the rocker panel flanges from corrosion.

Those skilled in the art will appreciate that various adaptations and modifications of the just-described, preferred embodiment, and can be configured without departing from the scope and spirit of the invention. Therefore, it is to be understood that within the scope of the appended claims, the invention may be practiced other than is specifically described herein.

What is claimed is:

1. A combination vehicle and finishing trim, wherein the finishing trim is mounted to downwardly facing, exterior rocker panel flanges on each side of an underbody of the vehicle, and wherein the finishing trim comprises:

a plurality of elongated, shaped strips of metal having an interior and an exterior; said plurality of elongated, shaped strips of metal being sized and dimensioned so that their interiors fit over and entirely cover the downwardly facing, exterior rocker panel flanges on each side of the underbody of the vehicle in a position where at least one elongated, shaped strips of metal may always be seen when viewing the vehicle from each side;

the plurality of elongated, shaped strips of metal having a finish thereon for covering and customizing the looks of the downwardly facing, exterior rocker panel flanges on each side of the underbody of the vehicle for providing a cleaner and more aesthetically-pleasing appearance to the vehicle; and securing means for securing said plurality of elongated, shaped strips of metal on the downwardly facing exterior rocker panel flanges on each side of the underbody of the vehicle.

2. The combination vehicle and finishing trim of claim 1 wherein the plurality of elongated, shaped strips of metal have a plurality of openings formed therein, and a plurality of set screws are held in the plurality of openings for securing the plurality of elongated, shaped strips of metal to the downwardly facing exterior rocker panel flanges on each side of the underbody of the vehicle.

3. The combination vehicle and finishing trim of claim 2 wherein the plurality of elongated, shaped strips of metal are substantially U-shaped.

4. The combination vehicle and finishing trim of claim 2 wherein the plurality of elongated, shaped strips of metal are substantially V-shaped.

5. The combination vehicle and finishing trim of claim 2 wherein the plurality of elongated, shaped strips of metal are substantially circular in shape.

6. The combination vehicle and finishing trim of claim 1 wherein the plurality of elongated, shaped strips of metal are substantially L-shaped.

7. The combination vehicle and finishing trim of claim 6 wherein the securing means is a silicone sealer.

8. The combination vehicle and finishing trim of claim 2 wherein the plurality of elongated, shaped strips of metal are shaped as a single curve.

9. The combination vehicle and finishing trim of claim 8 wherein the securing means is a silicone sealer.

* * * * *